Aug. 6, 1963 J. W. CROWE 3,100,267

SUPERCONDUCTIVE GATING DEVICES

Original Filed Aug. 27, 1957 4 Sheets-Sheet 1

INVENTOR
JAMES W. CROWE

BY George Baron

ATTORNEY

United States Patent Office 3,100,267

Patented Aug. 6, 1963

3,100,267
SUPERCONDUCTIVE GATING DEVICES

James W. Crowe, Red Hook, N.Y., assignor to International Business Machines Corporation, New York, N.Y., a corporation of New York Continuation of application Ser. No. 680,456, Aug. 27, 1957. This application Oct. 26, 1959, Ser. No. 848,870
9 Claims. (Cl. 307—88.5)

This invention relates to electrical devices, and particularly to those devices employing superconductors.

This application is a continuation of Serial No. 680,456, filed August 27, 1957, now abandoned.

The properties and characteristics of superconductors have been treated in such texts as "Superfluids," volume I, by Fritz London, published in 1950 in New York by John Wiley & Sons, Inc., and "Superconductivity" by D. Shoenberg, published in 1952 in London by the Cambridge University Press. In general, a superconductor is a metal, an alloy or a compound that is maintained at very low temperatures, i.e., from 17° K. to the practical attainability of absolute zero, in order that it may present no resistance to current flow therein. It was discovered that in the case of mercury its electrical resistance decreased as a function of decreasing temperature until at a given temperature (about 4.12° K.) the resistance very sharply vanished, or its measurement was too small to be detected. The temperature at which the transition to zero resistance took place in mercury was referred to as its critical temperature; its state, upon reaching zero resistance, was that of a superconductor.

The critical temperature varies with different materials, and for each material it is lowered as the intensity of the magnetic field around the material is increased from zero. Once a body of material is rendered superconductive, it may be restored to the resistive or normal state by the application of a magnetic field of a given intensity to such material; the magnetic field necessary to destroy superconductivity is called the critical field. Thus it is seen that one may destroy superconductivity in a specific material by applying energy to it in the form of heat so as to reach its critical temperature, or in the form of a magnetic field so as to reach its critical field.

In a plot of the magnetic field as the ordinate versus temperature as the abscissa, wherein the magnetic field is the critical field in gauss and the temperature is in ° K., one obtains a series of curves for different materials. If at a selected temperature, i.e., 4° K., one draws a line at right angles to the abscissa, such constant temperature line will intersect various curves at different points. Such intersections will represent the magnetic fields that are necessary to drive their respective materials to their resistive states for the selected temperature of 4° K. At the temperature of 4° K. one material may require only fifty gauss to be driven from its superconductive state to its resistive state, a second may require 300 gauss, a third may require 450 gauss, etc. For purposes of aiding in the discussion to follow, a hard superconductor is defined as that superconductor which, at a given operating temperature, requires a relatively high field or current to cause it to go resistive or normal conducting, whereas a soft superconductor is defined as that which requires a relatively low field or low current to cause it to go normal. It was also recognized that a closed path or ring of superconducting material (see paragraph 2.6 of the above cited Shoenberg text) will act as a barrier to a magnetic field that is normal to the plane of such closed path or ring. When that magnetic field is increased to the point that it exceeds the critical field of the superconducting material, the latter goes resistive, permitting the penetration of the magnetic field through the ring. It was not known, however, that the change in resistance of the superconductor could be caused to create a heating effect which further increased the resistance of the superconductive ring. If the ring could be caused to increase its resistance as a result of this heating, the changed resistance of the superconductive ring would be effective to accelerate the field, which acceleration would also heat the ring by inductive heating. The aforementioned regenerative effect and its recognition are exploited herein to produce more effective superconductive elements and devices.

One special application of this discovery is toward the construction of a novel cell to be used in computers wherein the geometry of the cell is such as to inductively store energy during the interval when the superconductive closed path is being driven toward its resistive state. The cell is also capable of releasing such inductively stored energy so that the latter manifests itself as a heat generator or as a means for generating a rapidly changing magnetic field. This invention will deal with instrumentalities that will make use of the heating effect, per se, to cause a very rapid switching of the superconductive cell, per se, or to cause the rapid switching of other superconductor elements. Where it is desired to make use of the rapidly changing field, a suitable sensing device will be placed in the path of such rapidly changing magnetic field so as to transmit an amplified signal to a suitable utilization circuit.

Wherein it is desired to exploit the regenerative heating effect of a switching superconductor cell to achieve control of other superconductors, a hard superconductor is placed adjacent to and in heat-conducting relationship with a soft superconductor. The soft superconductor will require a relatively small critical magnetic field to make it go resistive and regeneratively heat up to give a rapid temperature rise, say of the order of $$\frac{3\text{–}15^\circ \text{ K.}}{1\text{–}15 \text{ millimicroseconds}}$$

The heat energy is transmitted to the hard superconductor to raise its temperature so as to drive it resistive or normally conductive. Since the hard superconductor requires a relatively large critical field to drive it resistive, the use of a low critical field as a means for driving a soft superconductor into its resistive state so that the latter, when it regeneratively heats up, can switch a hard superconductor to its resistive state attains amplification. A relatively small current in a drive winding associated with a soft superconductor of the novel superconductive cell will cause the soft superconductor to go resistive and the heat regeneratively produced will control the state of a hard superconductor, the latter capable of carrying a relatively large current. Thus a small current change in a soft superconductor can be made to control the passage of a large current in a hard superconductor. It will also be shown hereinafter that a change in state of any superconductor, i.e., when the latter is made to switch from its superconductive state to its resistive state so as to produce a regenerative heating effect, can be made to control another superconductor regardless of the relative hardness or softness of the two superconductors.

Accordingly it is an object of this invention to provide a novel cell employing superconductive elements.

It is a further object to attain a superconductive cell capable of being switched very rapidly.

It is yet another object to provide a rapidly switching cell that is exceedingly small in size and mass so that its use in computers will serve to reduce the over-all size of such computers.

Still another object is to control the switching of a second superconductor by the heat regeneratively produced when a first superconductor is made to go resistive.

A further object is to employ a soft superconductor to control a hard superconductor, yet provide means to prevent the field produced by a current flowing in the hard superconductor from affecting the operating characteristics of the soft superconductor.

Other objects of the invention will be pointed out in the following description and claims and illustrated in the accompanying drawings which disclose, by way of example, the principles of the invention and the best modes which have been contemplated of applying those principles.

Figures 1, 3:
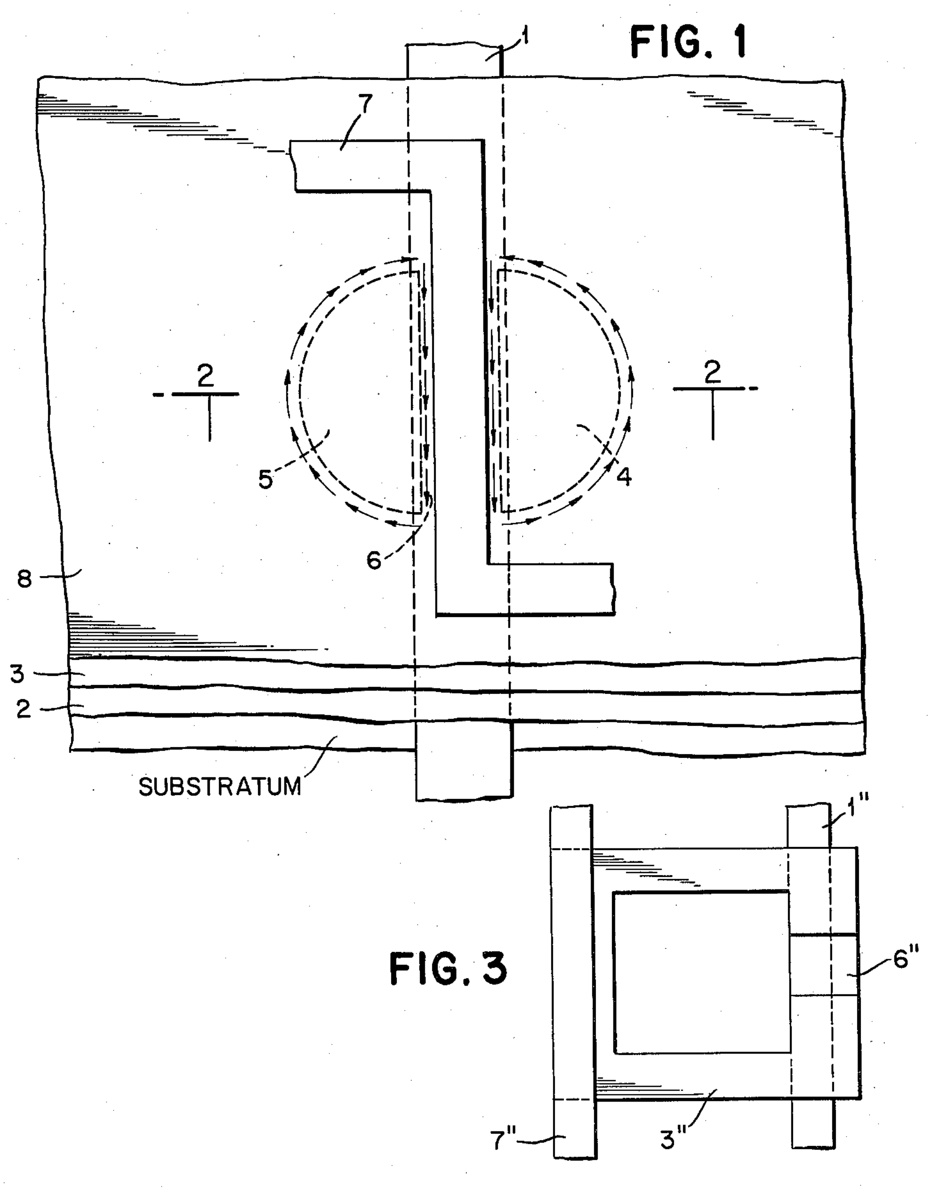
FIG. 1 illustrates an arrangement of a superconductive cell and heat control trigger constructed in accordance with the principles of the present invention.
FIG. 3 illustrates a modification of the memory cell and heat control trigger shown in FIG. 1.
Figure 2:
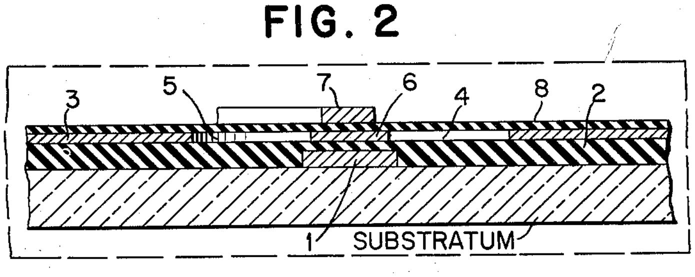
FIG. 2 is a cross-section of FIG. 1 taken along line 2—2 of FIG. 1.

Referring to FIG. 1 there is shown a superconducting film or layer 1 to be controlled, such film 1 being supported on a suitable substratum of aluminum oxide, glass, or similar insulated self-supporting base. An insulator 2 of crystalline aluminum oxide is deposited over superconductive film 1, such insulator 2 being selected because it is a good conductor of heat or readily permits the passage of heat therethrough. Above this insulator 2 is deposited another superconductive layer 3 wherein, by the use of masks or etching, holes 4 and 5 are made in such superconductive layer 3. The cut-outs 4 and 5 leave a very narrow cross-bar 6 in the superconductive layer 3. Separating the cross-bar 6 from another superconductive layer 7 is a layer 8 of silicon monoxide or magnesium fluoride or any other suitable insulator having relatively poor heat conducting characteristics. Where it is desired to package the layers described hereinabove, silicon monoxide may be used to encase all the layers to protect the latter from direct contact with the atmosphere. In an actual construction of this cell shown in FIG. 1, lead, or lead containing a slight amount of impurities, 1500 angstroms thick was deposited on the substratum to form superconductive film 1, such deposition using vacuum metalizing techniques. After a coating or layer of aluminimum oxide of about 1000 angstroms thick was deposited upon film 1, a second superconductive layer of lead similar to that of layer 1 was deposited to make superconductive film 3, such film 3 being of the order of 800 angstroms thick. By etching or using a mask substantially semi-circular holes 4 and 5 are produced in the deposited film 3 save for the cross-bar 6, such cross-bar 6 being 0.12 millimeter wide and about $\frac{3}{10}$ of a centimeter in length, or about the diameter of the hole produced when the two semi-circular cut-outs 4 and 5 are merged. The insulated layer 8 of silicon monoxide is about 800 angstroms thick and the drive wire 7 was of lead and was 1500 angstroms thick.

Figure 6:
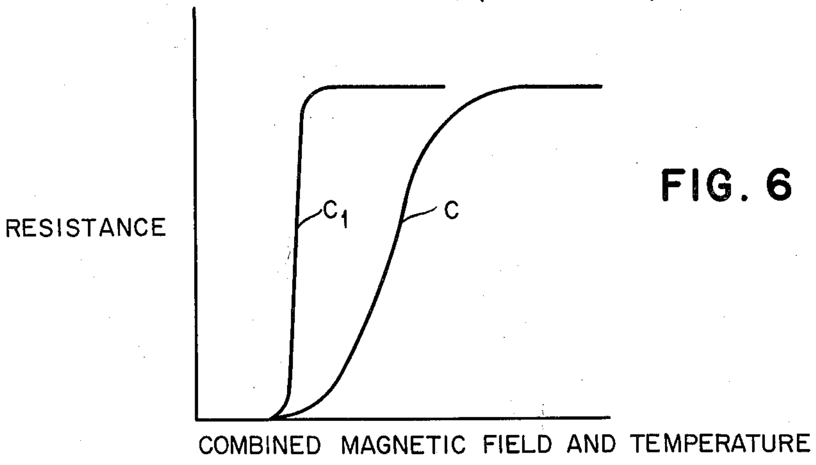
FIG. 6 is a plot of resistance versus the combined magnetic field and temperature affecting a superconductor.
Figures 7, 8:
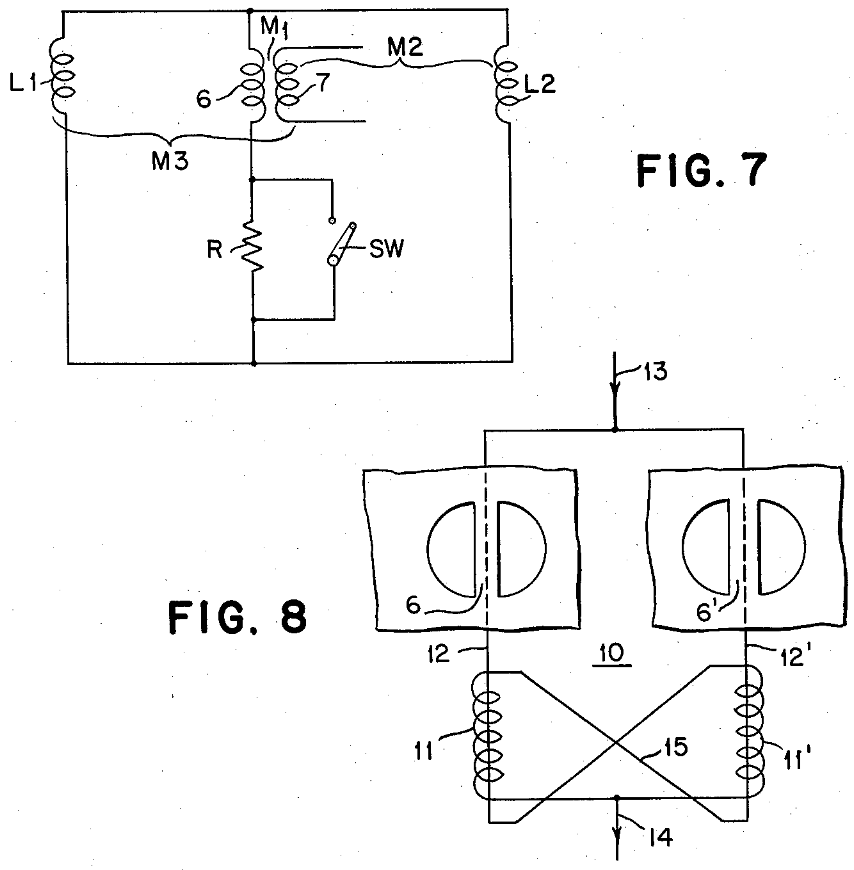
FIG. 7 is an equivalent circuit for the superconductor cells and heat control triggers depicted in FIGS. 1 and 3.
FIG. 8 is a schematic diagram of an embodiment of the invention wherein the heat control trigger of the types shown in FIGS. 1 and 3 are employed to actuate a flip-flop employing superconductive elements.

The operation of the cell of FIG. 1 as a heat control trigger will be now described with reliance being had on FIGS. 6 and 7 to aid in explaining such operation. When a current of the order of 500 ma. having a rise time of the order of millimicroseconds is applied to drive wire 7, the magnetic field generated by the current in drive wire 7 links the geometry of the holes 4 and 5 with that of the drive wire 7 so that there is an inductive coupling between the holes 4 and 5 and the drive wire 7. An electromagnetic force is generated in the holes, producing circulating currents in the superconductive material surrounding the holes. The circulating currents, as the arrows show, would pass along the surface of cross-bar 6 and superconductive film 3, forming two closed paths about holes 4 and 5. These circulating currents, or screening currents as they sometimes are called, set up their own flux to oppose the flux set up by the drive current. This takes place because a superconductive plane acts as a barrier to the passage of flux therethrough. As the initial flux attempts to penetrate the superconductive barrier, screening currents are set up in the superconductive barrier, which screening currents ceate their own flux to oppose the initial flux, so that no net flux penetration of the superconductive film 1 takes place. Such screening currents are stored as magnetic fields in the inductances of the holes 4 and 5 until the screening currents produced in the cross-bar 6 reach the critical current of cross-bar 6 and drive it into its resistive or normal conducting state. As soon as the cross-bar 6 becomes resistive, the fields built up in the inductances as well as the field generated by the current in drive wire 7 punch through the cross-bar 6, since the latter is no longer capable of acting as a barrier to such fields. Not only does the cross-bar 6 heat up when it goes normal conducting, but the inductively stored magnetic field as well as the increased field of the drive wire 7 now burst through, as it were, with tremendous force across the bar 6, such bursting through serving to inductively heat up bar 6, which in turn permits flux to pass extremely rapidly through the plane of the cross-bar 6. The aforementioned regenerative effect accomplishes two features which were hitherto unknown, namely, that (1) by proper selection of the geometry of the hole and its superconductive cross-bar, as well as the rise time of the drive current employed to create a field affecting such cross-bar, one can obtain an inductive storage of energy in the form of a magnetic field which, when released, will cause such regenerative switching of a superconductive cross-bar that the latter will heat up an amount such that $$\frac{\Delta T}{\Delta t}$$

is of the order of $$\frac{3\text{–}15^\circ\ \text{Kelvin}}{1\text{–}15\ \text{millimicroseconds}}$$

producing an exceptionally fast heat control trigger; and (2) by such operation of the cell shown in FIG. 1, the magnetic fields namely, the inductively stored field and that field produced by current flowing in drive wire 7 that burst through the superconductive plane that includes cross-bar 6 do so with such speed that a sensing device lying in the path of such fields will produce a relatively high signal in response thereto. The cell of FIG. 1 serves both as a heat generator or as a switching device that gives an amplified signal to a suitable sensing device.

FIG. 7 is an equivalent circuit for the heat control trigger wherein $L_1$ is considered the inductance of hole 4 and $L_2$ is the inductance of hole 5. The drive winding 7 is inductively coupled to cross-bar 6. Switch *sw* is effectively closed when the cross-bar 6 is in its superconductive state and there is no resistance R present in the cross-bar 6 circuit. There is some mutual inductive coupling between drive winding 7 and cross-bar 6 as well as between drive winding 7 and the inductances represented as $L_1$ and $L_2$ of the holes. These mutual inductances are shown as $M_1$, $M_2$, and $M_3$. As the drive current in drive wire 7 increases, a magnetic field is created around drive wire 7 which couples cross-bar 6 with flux lines. These flux lines cannot penetrate the plane that includes superconductive cross-bar 6, so screening currents are built up which circulate in the superconductive area about holes 4 and 5, such screening currents building up a magnetic field that opposes the magnetic field created by drive current in drive winding 7. The inductive build-up of magnetic field in the inductances increases as the screening currents increase, until the latter reach the critical current for cross-bar 6 driving the cross-bar 6 resistive. As soon as resistance R appears in the cross-bar circuit, the opposing magnetic field created by such screening currents collapses very quickly and acts as an inductive kick through resistance R (switch *sw* being now effectively open), causing a relatively high $i^2R$ heating of cross-bar 6 and a sharp rise in its temperature. Either the rapid heating or the rapid flux break through can be sensed, if desired. If the drive current through drive wire 7 should be withdrawn before the cross-bar 6 relaxes or cools down sufficiently to reach its superconductive state, then no flux will be trapped in the areas about holes 4 and 5. If the drive current is made to persist until the cross-bar 6 cools down to its superconductive state and then withdrawn, flux may be trapped in the areas about holes 4 and 5 so as to support circulating currents in the superconductive area about holes 4 and 5. A copending application entitled "Electrical Apparatus," Serial No. 615,830, filed October 15, 1956, by the instant applicant was directed towards a memory cell where it was particularly desirable to obtain flux trapping in a cell similar to the one shown in FIG. 1 of the present application so that the direction of flux trapping (either up through a hole or down through a hole) would be indicative of the storage of a binary "1" or a binary "0." In the present invention, the emphasis is on constructing a superconductor cell of a predetermined geometry so as to obtain rapid heating and fast flux change without any regard to the trapping of flux.

The geometry of the cell in FIG. 1 should be such that $$\frac{\Delta T}{\Delta t} \approx \frac{\text{Energy available for heating}}{\text{Rate of heat conduction away from the coss-bar 6 into the ambient temperature + heat capacity of the masses (cross-bar 6, aluminum oxide insulation and super-conductor 1 to be controlled by the cross-bar 6}}$$

The heat energy is made high by using a driving current having a fast rise time (of the order of 100 millimicroseconds up to 500 microseconds) and the cross-bar 6 must not be too thick so that it will take too long to be driven into its resistive state. For it is only when the cross-bar 6 is in its resistive state do we get sufficient $i^2R$ loss in cross-bar 6, which $i^2R$ loss maintains the cross-bar 6 heated so as to regeneratively drive it resistive and permit the inductively stored flux to rapidly punch through such cross-bar 6. Thus in FIG. 6, curve C relates to a superconductor, for example, lead which contains a small amount of impurities and whose mass was too large to permit the regenerative heating effect to take place sufficiently quickly. Whereas curve $C_1$ relates to a mass of impure lead for cross-bar 6 which permitted a sufficient rapid rise in temperature to drive it resistive, so that the combined effects of a rapidly collapsing inductively stored magnetic field across cross-bar 6 and $i^2R$ loss in the same cross-bar 6 produced an available supply of heat energy. Since the heat energy produced appears for a very small time, of the order of 1–15 millimicroseconds, it does not dissipate to the surrounding bath of liquid helium in which the cell is placed. The heat capacities of the cross-bar 6 as well as the superconductor 1 to be controlled are low, so that the geometry of the cell permits one to attain a $$\frac{\Delta T}{\Delta t}$$

that is of the order of $$\frac{3\text{–}15°\ \text{K.}}{1\text{–}15\ \text{millimicroseconds}}$$

For the parameters selected in the illustrative example, an inductance of about 0.01 $\mu$henrys exists in the superconductive surfaces surrounding holes 4 and 5. The amount of current that can be carried by the cross-bar 6 before it reaches its critical current would be a function of its composition and size, whereas the inductance of the cell would be effected by its geometry, such as shape of the holes 4 and 5, disposition of the cross-bar 6 and location of the drive winding 7.

In FIG. 3 there is shown another way of constructing the invention of FIG. 1. The superconductive film 3″ is substantially U-shaped having a soft superconductive cross-bar 6″ at the arms of the U-shaped superconductor layer 3″. The drive winding 7″ is located along an edge of the superconductor 3″ to create circulating currents therein so as to effect soft superconductor cross-bar 6″. Superconductor 1″ to be controlled is placed adjacent the soft superconductor 6″. The cell geometry of FIG. 3 is selected so as to attain rapid rise in heat near the soft superconductor cross-bar 6″. The insulating layers have been omitted from FIG. 3, but it is to be understood that they would be employed when constructing the cell of FIG. 3.

Attention is now turned to FIG. 8 of the drawing to illustrate how the instant invention may be employed to especial advantage in other superconductive circuits, namely, the cryotron, as described in an article by D. A. Buck entitled "The Cryotron—A Superconductive Computer Component," appearing in the April 1956 issue of The Proceedings of the IRE, pages 482–493. FIG. 8 shows a cryotron flip-flop 10 comprising a control winding 11 made of niobium or lead so that, at the temperatures at which the flip-flop 10 operates, such control winding 11 will always remain in its superconductive state. The control winding 11 is wrapped around another superconductor 12, called the "gate circuit," the latter being made of a material which can be driven to its resistive state by the combination of two fields, namely, the field produced by the current in control winding 11 and the field produced by the self-current flowing in gate circuit 12. It is the vector sum of these two fields that drives the gate circuit 12 resistive.

The cryotron flip-flop 10 is set into operation by making one of the gate circuits 12 or 12¹ go normally conductive so that current entering at input lead 13 will take one parallel path in preference to the other before leaving the flip-flop 10 through output lead 14. Assume that gate circuit 12 is rendered resistive, then current will flow from lead 13, through gate circuit 12¹, winding 15, through control winding 11 and out through lead 14. The current through control winding 11 will continue to create a magnetic field that will keep gate circuit 12 resistive, whereas no current will flow through control winding 11¹ to affect gate circuit 12¹. In order to flip the current from one gate circuit to another gate circuit, current from another source, not shown, is made to flow in winding 11 so as to drive gate circuit 12¹ resistive, causing the current entering the flip-flop 10 at lead 13 to switch to gate circuit 12. This manner of switching is believed to be too slow, say of the order of 130 $\mu$seconds.

By inserting in the gate circuits of the cryotron flip-flop the heat control triggers of the instant invention, the cryotron flip-flop 10 can be switched from one path to its other path extremely rapidly, i.e., in about 1 to 15 millimicroseconds. This is accomplished by placing a cross-bar 6, 6¹ of each heat control trigger over each gate circuit 12, $12^1$, respectively, and employing a drive winding (not shown) to initiate the regenerative heating of one of said cross-bars to selectively drive its corresponding gate circuit 12, $12^1$ to its resistive state so that the flip-flop 10 can be made to rapidly switch from one "state" to its other "state."

Figure 9:
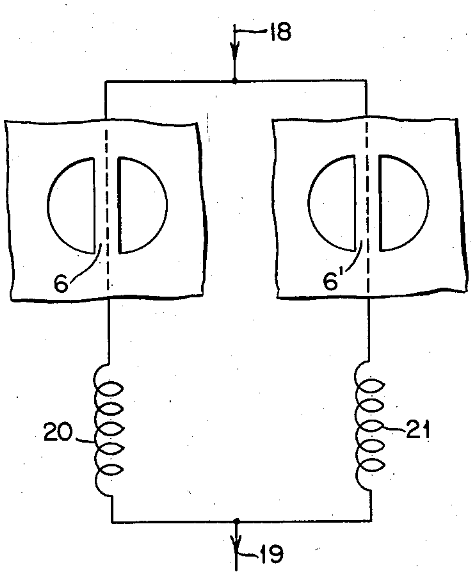
FIG. 9 is a schematic diagram of a further embodiment of the invention wherein a heat control trigger is employed to control a superconductor switch.

FIG. 9 is an example of the instant invention as it is applied to a superconductive switch wherein parallel paths are provided for the current entering lead 18 and leaving at lead 19. Superconductive elements 20 and 21 each lie in a superconductive path. It is desired to have all the current entering at lead 18 flow into one path only, say along the path that includes superconductor 21, then cross-bar 6 is driven to heat up regeneratively so as to apply its heat to the superconductive element below it, driving resistive the superconductive path that includes superconductive element 20 and diverting all the current through superconductor 21. When the path including element 20 cools to below its critical temperature, it will become superconductive again, but no current will flow in such path since there is no mechanism to cause the superconductive current in element 21 to be withdrawn therefrom. If it is desired to divert the current from the right branch of FIG. 9 to the left branch of FIG. 9 then the cross-bar $6^1$ of its heat control trigger is actuated to drive the right branch resistive. Although only two parallel paths are shown, it is clearly understood that more than two parallel paths may be employed.

Figure 4:
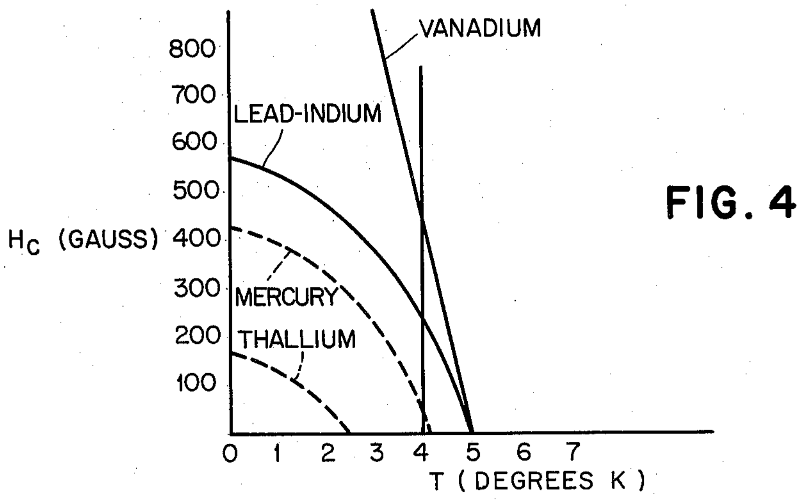
FIG. 4 is a plot of the characteristic curve of critical field versus absolute temperature for various superconductor materials.

Turning to FIG. 1, it is seen how the heat control trigger serves also as an amplifier. Assume that the superconductor 1 to be controlled is a hard superconductor such as vanadium, whose $Hc$-T plot is shown in FIG. 4, and the soft superconductor cross-bar 6 is lead-indium. For a given temperature of 4° K., a small critical field applied to cross-bar 6 will cause it to go resistive but will have no effect upon vanadium since it needs a much higher critical field to make it go resistive. But the high heat developed by the cross-bar 6 when it regeneratively goes resistive will cause the hard superconductor 1 to go resistive. Since the current-carrying capacity of hard superconductor 1 is much higher than that of drive wire 7 and soft superconductor 6, a high current flow is controlled by a low current flow, resulting in amplification.

Figure 5:
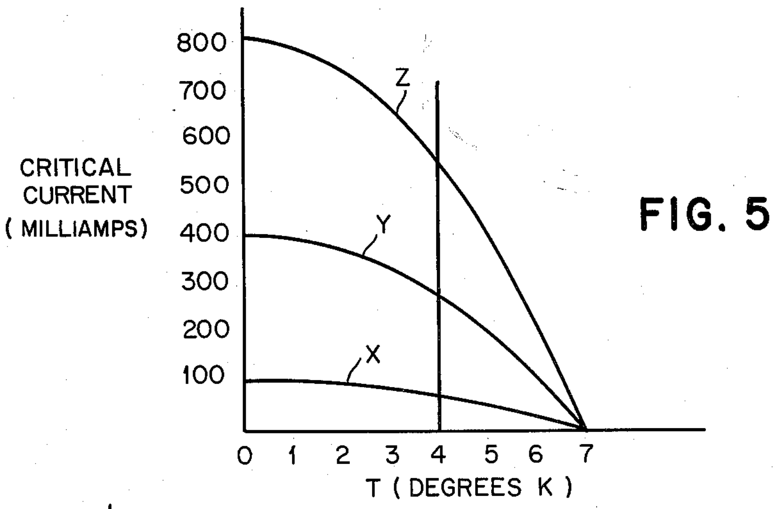
FIG. 5 is a plot of critical current versus temperature for the same superconductor material of different cross-sectional areas.

It is to be understood that it is not necessary that the hard superconductor be of a different material than the soft superconductor. If the superconductor to be controlled has a larger mass than the cross-bar or controlling superconductor, the former superconductor can be considered "hard" with respect to the latter superconductor. FIG. 5, for example, depicts the plot of critical current versus temperature of the same superconductor (lead) but the cross-section or the product of thickness and width of the superconductor is made variable, curve X having the least value for its thickness-width product, curve Z having the highest value, and curve Y having an intermediate value. For purposes of practising the instant invention, the lead that has the characteristic plot of the Z curve is a hard superconductor with respect to the lead corresponding to the plots of curve Y and curve X.

If desired, one may use the rapid heating that takes place when a hard superconductor is switched in accordance with the teachings of this invention to cause a soft superconductor to go resistive. This will not produce the amplification that takes place when a soft superconductor goes regeneratively resistive and its heat and collapsing magnetic fields are used to switch a hard superconductor, but the soft superconductor may be made to switch extremely rapidly. Such extremely rapid switching may have particular application in computing devices and the like.

Figure 10:
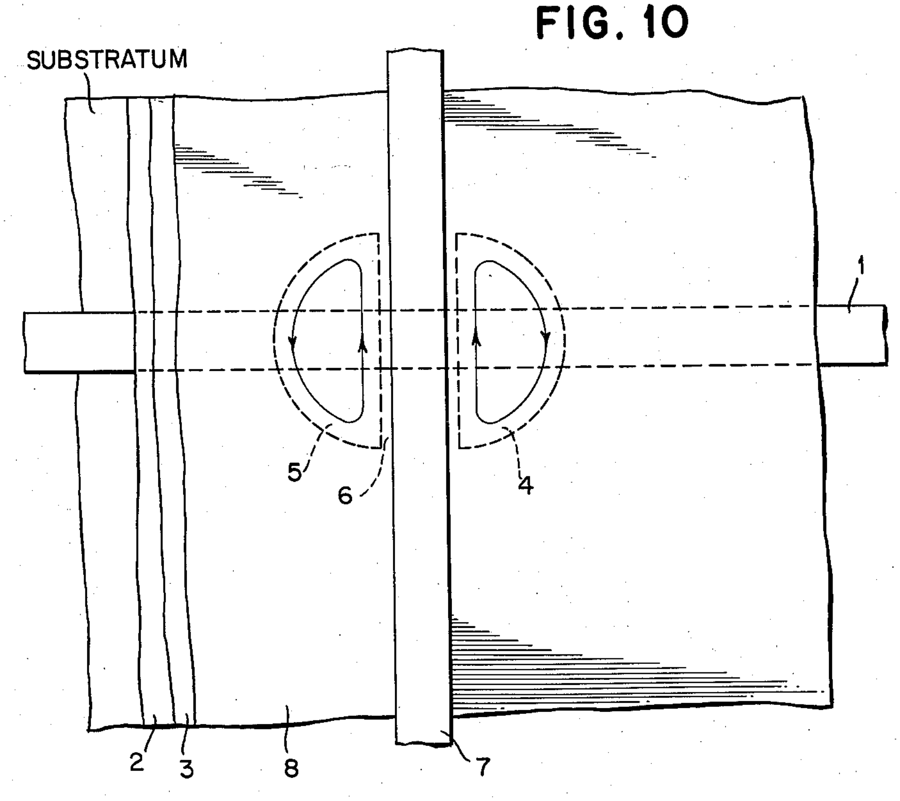
FIGS. 10 and 11 are further embodiments of the invention shown in FIGS. 1 and 3.
Figure 11:
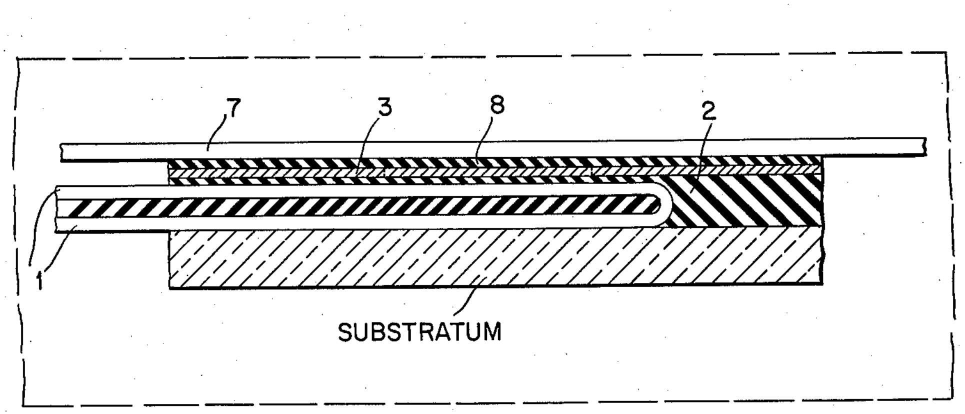

FIGS. 10 and 11 relate to preferred embodiments of the invention when the latter is employed as an amplifier. Since the superconductive element 1 to be controlled may be carrying a current, such current will produce a field about the element 1. This field will be in the same direction as the field that is produced about cross-bar 6 when the latter has screening currents circulating therein. To prevent the field of the controlled element 1 from affecting the cross-bar 6, the former is disposed at right angles to the latter, as shown in FIG. 10, to nullify the undesired back effect of the field about element 1 upon cross-bar 6.

In FIG. 11, the element 1 to be controlled is bent back upon itself so that opposing fields are produced by the current being carried by superconductive element 1. Such opposing fields cancel and prevent a back effect upon cross-bar 6. It is to be understood that these same modifications depicted in FIGS. 10 and 11 can be applied to that embodiment of the invention shown in FIG. 3.

The principles of superconductivity and magnetic storage have been exploited in a novel way to produce a basic superconductive cell whose geometry is such as to permit rapid switching of a superconductive film or bar from its superconductive state to its resistive state in a time that is one hundred times faster than the switching time of ferrite cores. Considerably less current is required to switch such superconductive cell than is required to switch such ferrite cores. Moreover the inductive release of magnetic fields created by screening currents in the cell permits not only a rapid heating of the superconductive element of the cell so as to provide temperature changes of the order of $$\frac{3\text{–}15° \text{ K.}}{1\text{–}10 \text{ millimicroseconds}}$$

but it also provides for a very rapid break through of fields through a closed superconductive path, such rapid break through providing a relatively strong signal to a sensing circuit coupled to such cell. The novel cell described herein can be employed to provide extremely rapid control to other circuits, particularly circuits employing superconductive elements. The cell, dimension-wise, can be packaged in extremely small arrays, so that their use in computers and the like will reduce the overall size of the latter.

What is claimed is:

1. A superconductive device comprising a superconductive circuit that includes a closed superconductive path, a portion of said superconductive path being a soft superconductor as compared to other portions of said circuit, said soft superconductor portion being of the order of 0.3 cm. in length, 0.12 millimeter wide and 800 angstrom units thick, and said closed path is in the form of an arc having a radius of the order to 0.15 cm., means to cause said superconductive circuit to store energy and to cause said soft superconductive circuit to become normal conducting thereby dissipating said energy in the form of heat, heat insulating means having a predetermined heat conductivity surrounding said soft superconductor, said soft superconductive portion having a predetermined heat capacity and a predetermined critical temperature whereby the rate at which said energy is dissipated in the form of heat being fast compared to said predetermined heat conductivity, and the magnitude of heat produced by said energy being high as compared to said predetermined heat capacity so that said soft superconductor portion is driven above its critical temperature.

2. The device of claim 1 which further includes an additional superconductive member positioned in heat transfer relation to said soft superconductor portion.

3. A device according to claim 2 wherein said additional superconductive member is hard as compared to said circuit portion.

4. A superconductive device comprising a superconductive element in the shape of a rectangle that forms a closed superconductive path, a portion of one side of said rectangular element including a superconductive segment having a lower critical current than the rest of said rectangular element, means to apply a magnetic field to an arm of said rectangular element other than the arm that includes said superconductive segment, said magnetic field applying means inducing a screening current in said closed superconductive path, and means located adjacent said superconductive segment for detecting when said segment goes normal resistive.

5. Means for controlling the superconductive state of a hard superconductor by that of a soft superconductor comprising a film of superconductive material having an aperture therein, a cross-bar of soft superconductive material mounted over the aperture and in abutting relationship with said film so that the surfaces of said film immediately surrounding said aperture and said cross-bar member form a closed superconductive path, drive means associated with said cross-bar for inducing screening currents therein which tend to drive said soft superconductor resistive, such screening currents producing fields that cannot break through a plane that includes such film and cross-bar so long as said soft superconductor remains superconductive, and a hard superconductor disposed in heat-transfer relationship with said soft superconductor and adapted to receive heat therefrom when said soft superconductor becomes heated due to said screening currents becoming sufficiently high to drive said soft superconductor into its normal resistive state, permitting the rapid collapse of any magnetic field supported by said persistent currents through said cross-bar.

6. A superconductive device of claim 5 wherein the hard superconductor to be controlled is disposed at substantially right angles to the controlling soft superconductor.

7. A superconductive device of claim 5 wherein the hard superconductor to be controlled is bent back upon itself so that the magnetic fields produced in said hard superconductor by its self-current will be cancelled.

8. A superconductive device comprising a first superconductive strip deposited upon an insulated, self-supporting substratum, a first heat-conductive, electrically insulated layer super-imposed upon said first superconductive strip, a second superconductive strip deposited upon said first insulated layer, an aperture in said second strip, said aperture being a complete aperture save for a narrow portion of said second superconductive strip which forms a diameter of said aperture, said narrow portion lying in heat-transferral relationship with said first strip, a second electrically insulated layer superimposed upon said second superconductive strip, and a third superconductive strip superimposed upon said second insulated layer, said third superconductive strip being magnetically coupled to said superconductive narrow portion of the second layer.

9. A device as described in claim 8 wherein the first superconductive strip is disposed at right angles to said third superconductive strip.

References Cited in the file of this patent

UNITED STATES PATENTS

| | | |
|---|---|---|
| 2,189,122 | Andrews | Feb. 6, 1940 |
| 2,695,396 | Anderson | Nov. 23, 1954 |
| 2,717,372 | Anderson | Sept. 6, 1955 |
| 2,913,881 | Garwin | Nov. 23, 1959 |
| 2,930,908 | McKeon | Mar. 29, 1960 |
| 2,977,575 | Hagelbarger et al. | Mar. 28, 1961 |